Nov. 29, 1966  A. RŮŽIČKA  3,288,027
TWO-PART NEGATIVE HOLDER
Filed Dec. 29, 1964  3 Sheets-Sheet 1
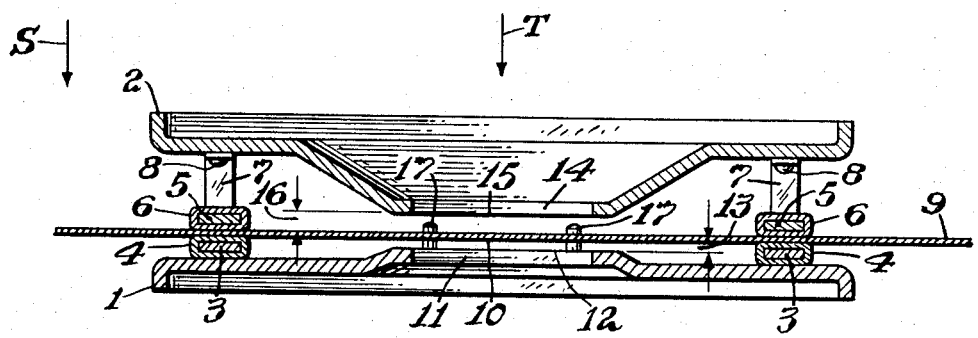
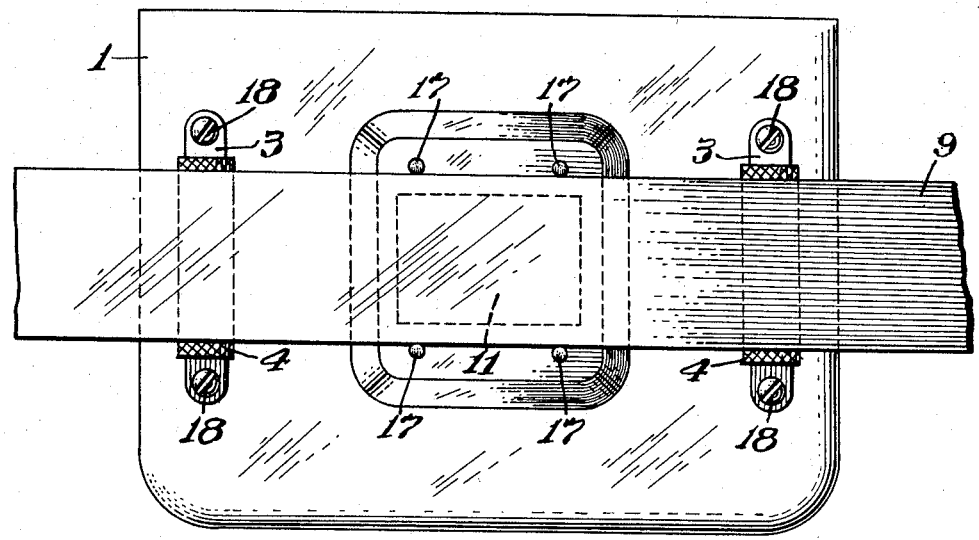
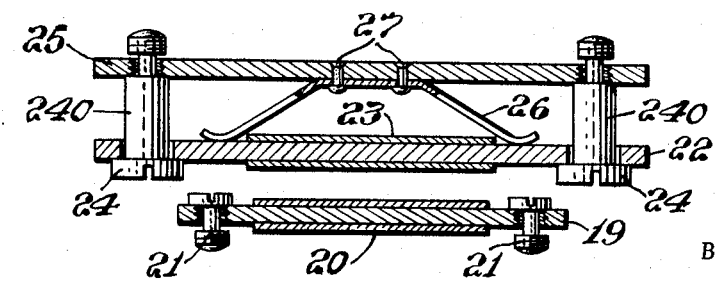
INVENTOR.
Antonín Růžička

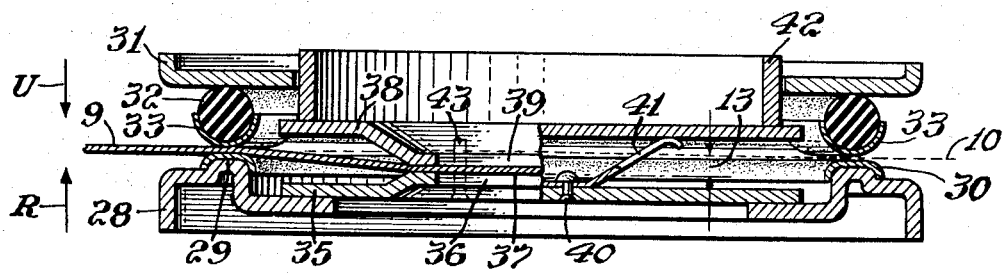
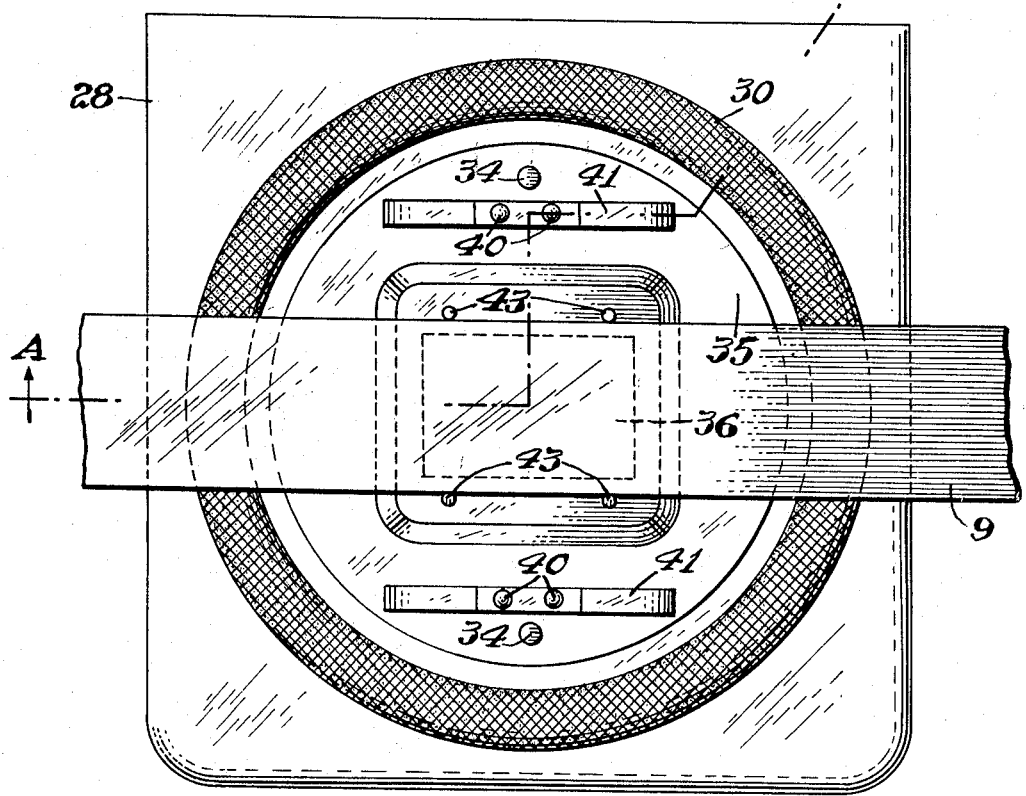

Nov. 29, 1966 A. RUŽIČKA 3,288,027
TWO-PART NEGATIVE HOLDER
Filed Dec. 29, 1964 3 Sheets-Sheet 3
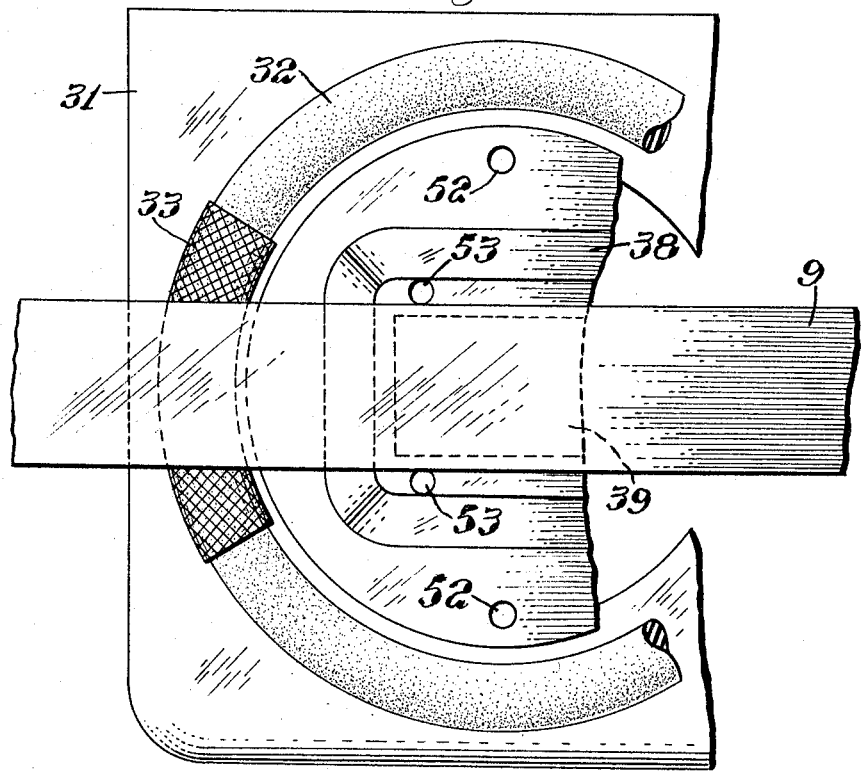
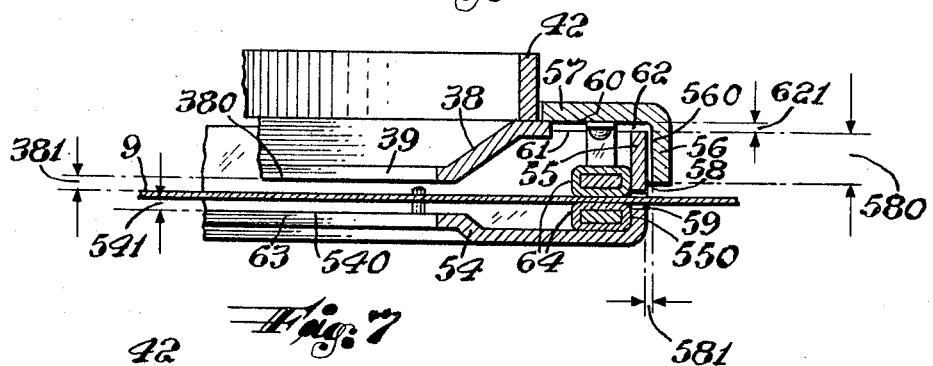
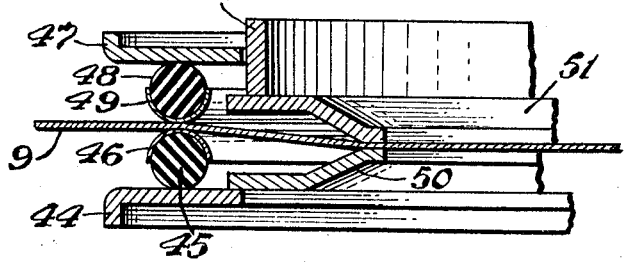
INVENTOR.
Antonín Ružička United States Patent Office 3,288,027
Patented Nov. 29, 1966

3,288,027
TWO-PART NEGATIVE HOLDER
Antonín Ružička, Prerov, Czechoslovakia, assignor to Meopta národní podnik, Prerov, Czechoslovakia
Filed Dec. 29, 1964, Ser. No. 421,840
Claims priority, application Czechoslovakia, Jan. 2, 1964, 25/64
10 Claims. (Cl. 88—24)

This invention relates to photographic enlargers or projection printers, and particularly to a negative holder for a projection printer.

It is an object of the invention to provide a negative holder capable of holding a film strip in a precisely defined position in the optical axis of the printer.

Another object is the provision of wipers which remove dust from the film strip as it approaches the aforementioned position.

A further object is the provision of a negative holder which permits a film strip to be moved longitudinally therethrough for sequentially aligning the several frames thereof with the optical axis of the printer while avoiding the formation of scratches in the emulsion.

With these and other objects in view, the invention in one of its aspects, resides mainly in a negative holder with wipers arranged in two pairs spaced from each other in a predetermined direction. The slots defined between the wipers of each pair extend transversely of the aforementioned direction substantially in a common plane so that they may simultaneously receive respective longitudinal portions of a film for movement of the film under tension in the afore-mentioned common plane while the film is simultaneously frictionally engaged by all four wipers.

The negative holder has two gate-forming members having respective oppositely disposed contact faces and formed with gate openings in the contact faces. Means are provided for moving the gate members relative to each other transversely of the afore-mentioned plane between an inoperative and an operative position. The contact faces are spaced from that plane in opposite directions in the inoperative position of the gate-forming members to permit free movement of the film therebetween in the plane. The contact faces are spaced from the plane in a common direction and closely adjacent each other for clampingly receiving the film therebetween while the gate openings are aligned in that common direction, when the gate-forming members are in their operative position.

Other features as well as additional objects and advantages of this invention will be readily apparent from the following detailed description of preferred embodiments when considered with the attached drawings in which:

FIG. 1 shows a negative holder of the invention in front elevational section, the holder being in the open position;

FIG. 2 show the bottom part of the holder of FIG. 1 in top plan view taken in the direction of the arrow S;

FIG. 3 shows a modified detail for the holder of FIG. 1 in side elevational section;

FIG. 4 shows a modified negative holder in elevational section on the line A—A in FIG. 5;

FIG. 5 illustrates the bottom plate of the holder of FIG. 4 in top plan view taken in the direction of the arrow U;

FIG. 6 shows the top plate of the holder of FIG. 4 in bottom plan view taken in the direction of the arrow R;

FIG. 7 shows another film holder of the invention in fragmentary elevational section, the holder being closed; and FIG. 8 shows an additional plate holder in elevational section, the holder being open.

The negative holder shown in FIGS. 1 and 2 is illustrated in the open position in which it permits longitudinal movement of the inserted film 9. The holder has a normally stationary bottom plate 1 and a movable top plate 2. Two bars 3 are fastened to the bottom plates 1 by screws 18 and are covered with tubular wiper facings 4 of felt or woven fabric. The bars 3 are elongated transversely of the direction of movement of the film 9 and spaced in that direction. Two similar bars 5 covered with wiper facings 6 are attached to the movable top plate 2 by leaf springs 7 and rivets 8. The weight of the top plate 2 and of the elements mounted thereon is transmitted by the wipers 6 to the associated wipers 4, respective longitudinal portions of the film 9 being received in the slots between each pair of associated wipers 4, 6.

The slots between the wipers 4, 6 define a normally horizontal plane of movement for the engaged film 9 in the illustrated open condition of the film holder. The film is laterally guided in this plane by four upright guide pins 17 on a raised central gate portion of the plate 1 which has a flat top face 12 for contact with the film 9, and is formed with a rectangular opening or gate 11 in the face 12. The central gate portion of the top plate 2 is depressed so as to project from the remainder of the plate 2 toward the plate 1, and the depressed central portion of the plate 2 has a flat bottom face 15 and is formed with a rectangular gate 14 vertically aligned with the gate 11. The plane 10, and the film 9 held therein by the wipers 4, 6 are vertically upwardly spaced from the top face 12 of the bottom plate 1 a distance 13, and are downwardly spaced from the bottom face 15 of the plate 2 a distance 16 by the resilient force of the springs 7.

In the illustrated open or inoperative position of the film holder, the film 9 is held by the wipers 4, 6 in the plane 10 at a safe distance 13, 16 from the nearest portions of the plates 1, 2 so that the film may be moved longitudinally through the film holder without danger of scratching by contact with hard surfaces. When a print is to be made, the movable top plate 2 is depressed in the direction of the arrow T by an element of the projection printer, not shown, as is conventional. The film is depressed by the gate portion of the plate 2 out of the plane 10 into contact with the gate portion of the bottom plate 1. The downward movement of the plate 2 increases the grip of the wipers 4, 6 on the engaged portions of the film 9, and the resulting longitudinal tension in the film 9 causes the film to lie flat over the gates 11, 14. Loose dust is wiped from the longitudinally moving film by the wipers 4, 6 which may be impregnated with silicon oil to facilitate movement of the film, and to obliterate previously formed scratches.

FIG. 3 shows removable dust wiper assemblies which may replace the wipers 4, 6 and supporting structure fastening the wipers to the top and bottom plates 1, 2 in FIG. 1.

A supporting bar 19 carries a wiper 20, and may be mounted on the plate 1 by means of screws 21. A carrier bar 22 equipped with a wiper 23 is mounted on a plate-shaped support 25 by means of shoulder bolts 24. Rivets 27 fasten a leaf spring 27 to the support 25. The spring 27 urges the bar 22 to slide toward the bar 19 on the smooth shank portions 240 of the bolts 24. The bolts 24 are adapted to attach the supporting plate 25 to the plate 2 of the film holder.

The modified film holder shown in FIGS. 4 to 6 has a bottom plate 28 provided with a circular central opening and a raised circular rim 29 about the aperture. The top of the rim 29 is conformingly covered by an annular felt wiper 30 adhesively secured to the rim 29 at least adjacent the path of the film 9. It cooperates with wipers 33 similarly attached to diametrically opposite sections of a toroidal backing member 32 of resilient foam rubber fastened to the top plate 31 near the path of the film 9, as best seen by joint consideration of FIGS. 5 and 6.

The central opening in the bottom plate 28 is almost completely closed by an inserted mask 35 attached to the plate 28 by pins 34 which project upward from the mask and slidably locate a corresponding mask 38 which is movably arranged on the top plate 31. A short cylindrical guide ring 42 on the mask 38 is axially slidable in a large central opening of the top plate 31 aligned with and similar to the central opening of the bottom plate 28. The opening is obstructed by the mask 38 except for a gate opening 39 in a central portion of the mask 38 which projects toward a corresponding projecting central portion of the stationary mask 35 provided with a gate opening 36. Leaf springs 41 attached to the mask 35 by rivets 40 urge the flat contact face of the movable mask 38 and the ring 42 upwardly away from the corresponding face 37 of the lower mask 35, and from the plane 10 defined by the cooperating faces of the wipers 30, 33 in the direction of the arrow R.

Guide pins 43 on the mask 35 laterally guide the film 9 through the gate area of the film holder and are movably received in openings 53 of the upper mask 38. Openings 52 in that mask movably receive the locating pins 34.

The device illustrated in FIGS. 4 to 6 operates in a manner closely similar to that described above with reference to FIGS. 1 and 2. The film is held flat in the plane 10 by the cooperating contact faces of the wipers 30, 33 as long as the negative holder is in the inoperative position. The film can be moved through the gate area between the contact faces of the masks 35, 38 without touching the masks, and without suffering scratches from contact therewith. When a non-illustrated part of the printer structure is lowered toward the support on which the lower plate 28 rests, the ring 42 and the upper mask 38 are moved toward the lower mask 35 against the restraint of the springs 41, thereby tensioning the film 9 until it lies flat between the contact faces of the masks. Entry of dust into the gate area is prevented by a circular seal formed by the backing member 32, the annular rim 29, and the interposed wipers 30, 33 which clean the film as it enters the gate area.

The modified negative holder of the invention only partly shown in FIG. 7 differs from that illustrated in FIG. 4 mainly by the provision of axially aligned toroidal foam-rubber backing members 45, 48 respectively mounted on the bottom plate 44 and the top plate 47 of the negative holder. The backing members are covered with adhesively secured felt or fabric wipers 46, 49 at least where the film 9 passes through the seal about the gate area provided by the backing members. An upper mask 51 is guided on the top plate 47 by a ring 42 toward and away from a mask 50 fixedly attached to the bottom plate 44.

The device shown in FIG. 7 operates in a manner closely analogous to that described with references to FIGS. 4 to 6, and does not require further explanation.

The negative holder partly shown in FIG. 8 is equipped with an annular labyrinth seal about the gate area and does not rely on resiliency of backing members. Whereas the masks 35, 38 of the afore-described negative holder are replaceable by masks having gate openings of different dimensions, FIG. 8 shows a negative holder intended for one negative size only, the lower plate 54 being itself provided with a gate opening 63 in its central raised portion. A vertically slidable mask 38 equipped with an actuating ring 42 and defining a gate 39 is provided on the top plate 57.

The plates 54, 57 have respective cylindrical, circumferential flanges 55, 56 which are coaxial and axially coextensive over a distance 580, and whose opposite surfaces 550, 560 are radially separated by a narrow annular gap 58 whose width 581 is less than one fifth of the distance 580.

The axial gap 62 between the free rim 61 of the flange 55 and the opposite radial face 60 of the top plate 57 has a width 621 which is much less than five times the width 581. The film 9 is freely movable in a longitudinal direction in passages 59 provided in the axial portion of the flange 55 which is not overlapped by the flange 56, only one of the two diametrically spaced passages 59 being seen in FIG. 8. Two dust wipers 64 are arranged near each passage 59 to seal the same against entry of external dust, and are supported on the top plate 57 and the bottom plate 54 substantially as described above with reference to FIG. 1. The mask 38 is movably mounted on the top plate 57, and urges the film 9 toward the gate portion of the bottom plate 54 in the non-illustrated operative position of the negative holder over a distance 541 which normally separates the film from the nearest surface 540 of the bottom plate 54. Similarly, a distance 381 normally separates the film from the contact face 380 of the mask 38 which could produce scratches in the film during longitudinal movement of the latter through the gate area in the illustrated non-operative condition of the negative holder.

A layer of grease normally clogs the gap 58, 62 to prevent entry of dust particles into the gate area and to trap freely floating dust particles. The operation of the negative holder of FIG. 8 is otherwise closely analogous to that of the afore-described other embodiments of the invention.

The negative holders of the invention permit a film to be printed without preliminary removal of dust and like contaminants. Unless the contaminants are firmly embedded in the film, for example, by contact with the emulsion while it is still wet and soft, they are retained automatically by the wipers. Scratching of the film surface during longitudinal film movement through the gate area is safely prevented because the film is held in stretched condition in a plane spaced from the contact faces of the gate portions of the negative holder while the film is being pulled through the gate area. When the contact faces are moved toward each other while the longitudinal movement of the film is stopped, the film is additionally stretched and thereby flattened for printing. It is clamped between the contact faces for precise positioning.

What is claimed is:

1. A negative holder for a projection printer comprising, in combination:
    (a) two pairs of wipers,
        (1) the wipers of one pair being spaced from the wipers of the other pair in a predetermined direction,
        (2) the wipers of each pair forming therebetween respective slots extending transversely of said direction substantially in a common plane,
        (3) said slots being adapted simultaneously to receive respective longitudinal portions of a film for movement of the film under tension in said plane while simultaneously frictionally engaged by said wipers,
    (b) two gate-forming members having respective oppositely disposed contact faces and formed with gate openings in said contact faces, and
    (c) actuator means for moving one of said members relative to the other transversely of said plane between an inoperative position and an operative position,
        (1) said contact faces in said inoperative position being spaced from said plane in opposite directions to permit free movement of said film therebetween in said plane, and (2) said contact faces in said operative position being spaced from said plane in a common direction and closely adjacent each other for clampingly receiving said film therebetween and said gate openings being aligned in said common direction.

2. A holder as set forth in claim 1, further comprising yieldably resilient means urging one wiper of each of said pairs toward the other wiper.

3. A holder as set forth in claim 2, wherein said wipers have dust-retaining textile facings.

4. A holder as set forth in claim 2, further comprising sealing means for sealing a gate area against entry of dust in a direction parallel to said plane, said contact faces being located in said area in said positions thereof.

5. A holder as set forth in claim 4, wherein said pairs of wipers are located in said area.

6. A holder as set forth in claim 2, further comprising top plate means and bottom plate means, one wiper of each of said pairs of wipers and one of said gate forming members being mounted on said top plate means, the other wiper of each of said pairs and the other gate forming member being mounted on said bottom plate means, and cooperating sealing means on each of said plate means for sealing a gate area between said plate means in all directions parallel to said plane, said sealing means including two annular sealing members respectively mounted on said plate means, said gate forming members being located in said gate area.

7. A holder as set forth in claim 6, wherein at least one of said sealing members is resilient.

8. A holder as set forth in claim 6, wherein at least one wiper of each pair of said wipers is mounted on said sealing members respectively.

9. A holder as set forth in claim 6, wherein said sealing members have respective closely spaced faces defining a narrow circumferential gap therebetween, respective portions of said gap being angularly offset relative to each other, each of said portions being annular about said gate area.

10. A holder as set forth in claim 9, wherein said sealing members constitute respective flanges on said plate means, said flanges arcuately extending about a common axis transverse of said plane, said flanges having respective opposite annular first face portions radially separated from each other by one of said portions of said gap and respective opposite annular second face portions axially separated from each other by the other portion of said gap.

References Cited by the Examiner

UNITED STATES PATENTS

| | | | |
|---|---|---|---|
| 1,418,830 | 6/1922 | Riesterer | 15—100 |
| 2,148,009 | 2/1939 | Bing | 15—100 |
| 2,174,660 | 10/1939 | Hirsch. | |
| 2,351,371 | 6/1944 | Smith | 88—24 |

FOREIGN PATENTS 685,182   3/1930   France.

NORTON ANSHER, *Primary Examiner.*

VANCE A. SMITH, *Assistant Examiner.*